United States Patent
Mitra et al.

(10) Patent No.: US 11,789,783 B2
(45) Date of Patent: Oct. 17, 2023

(54) HOSTED VIRTUAL DESKTOP SLICING USING FEDERATED EDGE INTELLIGENCE

(71) Applicant: BANK OF AMERICA CORPORATION, Charlotte, NC (US)

(72) Inventors: Bhaswati Mitra, Bangalore (IN); Sheirly Stephen Soans, Thane (IN); Oliver Sampson, Hyderabad (IN); Prasanna Soppimath, Secunderabad (IN); MadhuSudhanan Krishnamoorthy, Srivilliputtur (IN); Dimple Kapadia, Mumbai (IN)

(73) Assignee: Bank of America Corporation, Charlotte, NC (US)

( * ) Notice: Subject to any disclaimer, the term of this patent is extended or adjusted under 35 U.S.C. 154(b) by 136 days.

(21) Appl. No.: 17/368,322

(22) Filed: Jul. 6, 2021

(65) Prior Publication Data

US 2023/0009599 A1    Jan. 12, 2023

(51) Int. Cl.
*G06F 9/50* (2006.01)
*G06F 11/34* (2006.01)
*G06F 18/21* (2023.01)

(52) U.S. Cl.
CPC .......... *G06F 9/5055* (2013.01); *G06F 9/5072* (2013.01); *G06F 11/3438* (2013.01);
(Continued)

(58) Field of Classification Search
CPC .. G06F 9/5055; G06F 9/5072; G06F 11/3438; G06F 11/3442; G06F 18/2178; G06F 2209/503
See application file for complete search history.

(56) References Cited

U.S. PATENT DOCUMENTS 8,281,305 B2   10/2012 Otani
8,307,187 B2   11/2012 Chawla et al.
(Continued)

OTHER PUBLICATIONS

CompareSoft, Best Practices for Assigning IT Assets to Employees, Sep. 2019, comparesoft.com/it-assets-management-software/best-practices-to-assign-it-assets-to-employees/ (Year: 2019).*

(Continued)

*Primary Examiner* — Jorge A Chu Joy-Davila

(57) ABSTRACT

An apparatus includes a processor and a memory that stores a deep Q reinforcement learning (DQN) algorithm configured to generate an action, based on a state. Each action includes a recommendation associated with a computational resource. Each state identifies at least a role within an enterprise. The processor receives information associated with a first user, including an identification of a first role assigned to the user and computational resource information associated with the user. The processor applies the DQN algorithm to a first state, which includes an identification of the first role, to generate a first action, which includes a recommendation associated with a first computational resource. In response to applying the DQN algorithm, the processor generates a reward value based on the alignment between the first recommendation and the computational resource information associated with the first user. The processor uses the reward value to update the DQN algorithm.

20 Claims, 6 Drawing Sheets

(52) U.S. Cl.
CPC ...... *G06F 11/3442* (2013.01); *G06F 18/2178* (2023.01); *G06F 2209/503* (2013.01)

(56) References Cited

U.S. PATENT DOCUMENTS

| | | | |
|---|---|---|---|
| 8,359,594 | B1 | 1/2013 | Davidson et al. |
| 8,365,167 | B2 | 1/2013 | Beaty et al. |
| 8,458,700 | B1 | 6/2013 | Arrance et al. |
| 8,725,886 | B1 | 5/2014 | Pulier et al. |
| 8,856,337 | B2 | 10/2014 | Otani |
| 8,918,488 | B2 | 12/2014 | Umbehocker |
| 9,038,083 | B2 | 5/2015 | Huang et al. |
| 9,052,940 | B2 | 6/2015 | Chieu et al. |
| 9,075,664 | B2 | 7/2015 | Kannan et al. |
| 9,098,324 | B2 | 8/2015 | Li et al. |
| 9,218,176 | B1 | 12/2015 | Alberti et al. |
| 9,286,130 | B2 | 3/2016 | Ashok et al. |
| 9,323,565 | B2 | 4/2016 | Li et al. |
| 9,367,244 | B2 | 6/2016 | Kulkarni |
| 9,535,737 | B2 | 1/2017 | Joy |
| 9,639,384 | B2 | 5/2017 | Govindankutty et al. |
| 9,971,584 | B2 | 5/2018 | Kannan et al. |
| 10,089,130 | B2 | 10/2018 | Kim et al. |
| 10,089,133 | B2 | 10/2018 | Oh et al. |
| 10,146,591 | B2 | 12/2018 | Parashar et al. |
| 10,203,978 | B2 | 2/2019 | Li et al. |
| 10,298,666 | B2 | 5/2019 | Ringdahl et al. |
| 10,365,935 | B1 | 7/2019 | Keagy et al. |
| 10,416,986 | B2 | 9/2019 | Mukhopadhyay et al. |
| 10,498,807 | B2 | 12/2019 | Rivera et al. |
| 10,579,403 | B2 | 3/2020 | Antony et al. |
| 10,705,830 | B2 | 7/2020 | Mahajan et al. |
| 10,705,831 | B2 | 7/2020 | Mahajan et al. |
| 10,757,170 | B2 | 8/2020 | Thakkar et al. |
| 10,810,492 | B2 | 10/2020 | Xu et al. |
| 10,838,776 | B2 | 11/2020 | Mahajan et al. |
| 2012/0246695 | A1* | 9/2012 | Cameron ............ G06F 21/6236 726/1 |
| 2013/0074064 | A1 | 3/2013 | Das et al. |
| 2016/0335113 | A1 | 5/2016 | Gorst et al. |
| 2017/0220949 | A1 | 8/2017 | Feng et al. |
| 2018/0210748 | A1 | 7/2018 | Kakaraparthi |
| 2018/0302303 | A1* | 10/2018 | Skovron ................ H04L 41/082 |
| 2018/0307979 | A1 | 10/2018 | Selinger et al. |
| 2019/0205745 | A1 | 7/2019 | Sridharan et al. |
| 2019/0286472 | A1 | 9/2019 | Beveridge et al. |
| 2019/0294463 | A1 | 9/2019 | Mukhopadhyay et al. |
| 2020/0412726 | A1* | 12/2020 | Nevatia ................. H04L 63/102 |
| 2022/0215351 | A1* | 7/2022 | Chow ................ G06Q 10/1097 |
| 2022/0244969 | A1* | 8/2022 | Vajravel ................ G06N 5/04 |
| 2023/0024977 | A1* | 1/2023 | Watanabe ............... G06F 9/544 |

OTHER PUBLICATIONS

Tang, Zhenheng, "Communication-Efficient Distributed Deep Learning: A Comprehensive Survery," arXiv:2003.06307 [cs.DC], submitted Mar. 10, 2020, 23 pages, available at https://arxiv.org/abs/2003.06307.

Shi, Shaohuai, "A Quantitative Survey of Communication Optimizations in Distributed Deep Learning," arXiv:2005.13247v2 [cd.DC], submitted Nov. 7, 2020, 9 pages, available at https://arxiv.org/abs/2005.13247.

Bhaswati Mitra, et al. .; System and Method for Provisioning Hosted Virtual Desktop Resources To Remote Users; U.S. Appl. No. 17/368,162; attorney docket No. 015444.1782; application filed Jul. 6, 2021.

Bhaswati Mitra, et al. .; Synchronized Data Collection for Use in Hosted Virtual Desktop Slicing; U.S. Appl. No. 17/368,249; attorney docket No. 015444.1834; application filed Jul. 6, 2021.

* cited by examiner

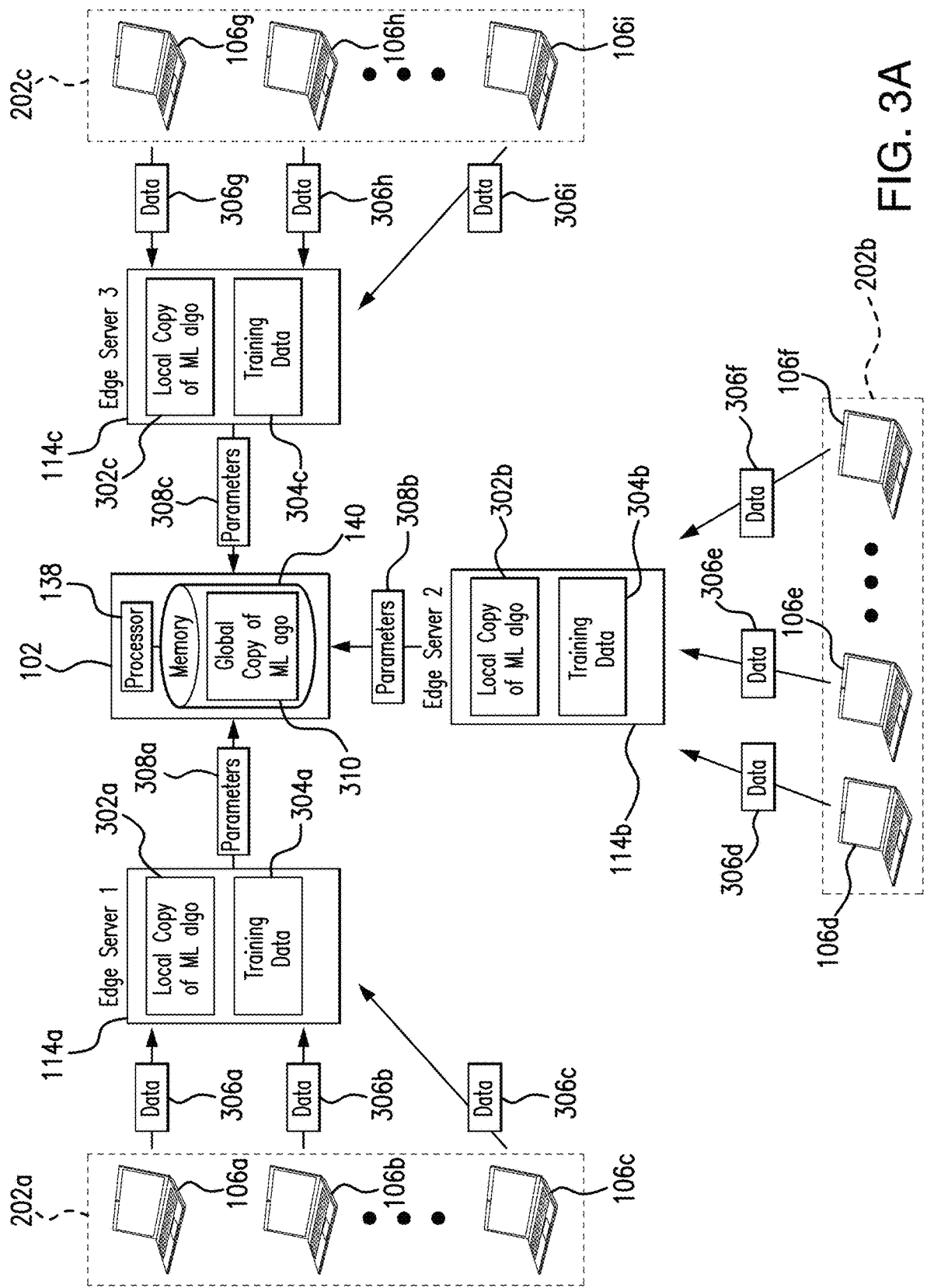

HOSTED VIRTUAL DESKTOP SLICING USING FEDERATED EDGE INTELLIGENCE

TECHNICAL FIELD

The present disclosure relates generally to interprocess communication and virtual task management, and more particularly, to hosted virtual desktop slicing using federated edge intelligence.

BACKGROUND

As part of a typical onboarding process, in which a new user is added to an enterprise system, the likely computational needs of the new user are assessed and computational resources are provisioned to the user accordingly. When performed manually, the task of identifying the probably computational needs of the new user often becomes a bottleneck in the onboarding process. While the use of telemetry enables the collection of detailed information about the computational resource usage of existing users, which could be leveraged to improve the efficiency of this process, the collection and storage of such detailed user-specific data within a central enterprise system raises a host of data privacy and security concerns.

SUMMARY

According to one embodiment, an apparatus includes a memory and a hardware processor communicatively coupled to the memory. The memory stores a machine learning algorithm configured, when implemented by the hardware processor, to generate, based on a given role of a plurality of roles within an enterprise, a policy for a new user. The new user is assigned to the given role. The policy includes one or more recommendations of virtual desktop resources to provide to the new user. The virtual desktop resources are associated with a system of the enterprise. The machine learning algorithm was trained using information identifying virtual desktop resources used by a set of existing users of the system. Each existing user of the set of existing users is assigned to a role of the plurality of roles within the enterprise. The hardware processor receives a request to provide a new user with access to the system of the enterprise. In response to receiving the request, the processor implements the machine learning algorithm to generate the policy for the new user. In response to generating the policy for the new user, the processor provisions the new user with the one or more virtual desktop resources recommended by the policy According to another embodiment, an apparatus includes a memory and a hardware processor communicatively coupled to the memory. The memory stores a machine learning algorithm configured, when executed by a hardware processor, to classify a set of telemetry data into two or more categories. Classifying a piece of telemetry data into a given category of the two or more categories includes determining that a probability that the piece of telemetry data is of a type associated with the given category is greater than a threshold. The hardware processor implements a communication synchronization scheme in order to receive, from a first device, a first set of telemetry data associated with a first user, and to receive, from a second device, a second set of telemetry data associated with a second user. The first user is assigned to a first role of a set of roles within an enterprise. The second user is assigned to a second role of the set of roles within the enterprise. The hardware processor also applies the machine learning algorithm to each of the first set of telemetry data and the second set of telemetry data, to generate a classified first set of telemetry data and a classified second set of telemetry data. The hardware processor additionally transmits, to a server, training data. The training data includes at least one of the classified first set of telemetry data and the classified second set of telemetry data, and a set of parameters derived from the classified first set of telemetry data and the classified second set of telemetry data. The server is configured to use the training data received from the apparatus to refine a reinforcement learning algorithm. The reinforcement learning algorithm is configured, when executed by a second hardware processor, to generate a recommendation of computational resources to provision to a new user.

According to a further embodiment, an apparatus includes a memory and a hardware processor communicatively coupled to the memory. The memory stores a deep Q reinforcement learning (DQN) algorithm that is configured, when executed by the hardware processor, to generate an action of a plurality of actions, based on a state of a plurality of states. Each action of the plurality of actions includes a recommendation associated with a computational resource of a set of computational resources. Each state of the plurality of states includes at least an identification of a role of a plurality of roles within an enterprise. The hardware processor receives a set of information associated with a first user. The set of information includes an identification of a first role of the plurality of roles. The first role is assigned to the first user. The set of information also includes computational resource information associated with the first user. The computational resource information includes information associated with a set of computational resources provisioned to the first user. The hardware processor also applies the DQN algorithm to a first state of the plurality of states, to generate a first action of the plurality of actions. The first state includes an identification of the first role assigned to the first user. The first action includes a first recommendation associated with a first computational resource of the set of computational resources. In response to applying the DQN algorithm to the first state to generate the first action, the hardware processor determines whether the first recommendation aligns with the computational resource information associated with the first user. The hardware processor additionally generates a reward value. The reward value generated is a positive value, in response to the hardware processor determining that the first recommendation aligns with the computational resource information associated with the first user. The reward value generated is a negative value, in response to the hardware processor determining that the first recommendation does not align with the computational resource information associated with the first user. The hardware processor further uses the reward value to update the DQN algorithm.

Certain embodiments provide one or more technical advantages. As an example, an embodiment implements one or more machine learning algorithms to automatically provision a new user with a set of virtual desktop resources. For example, an embodiment implements a reinforcement learning algorithm, trained to generate a resource provisioning policy for a new user that has a high likelihood of meeting the computational resource needs of the new user, based on the computational resource usages of similar existing users. As another example, an embodiment implements a distributed training scheme to efficiently train the machine learning algorithm. For example, certain embodiments use data parallelism techniques to train the algorithm. As another example, an embodiment uses a set of edge servers to collect telemetry data from existing users and to process the data for use in training the machine learning algorithm, prior to transmitting the training data to an internal enterprise system. In this manner, such embodiments anonymize the telemetry data before it reaches the internal enterprise system. As a further example, an embodiment implements a set of data compression techniques to compress the machine learning training data, thereby reducing the memory resources, network bandwidth resources, and processing resources consumed in storing the training data, transmitting the data, and using the data to train the machine learning algorithm.

The system described in the present disclosure may particularly be integrated into a practical application of an onboarding tool for use by an enterprise in provisioning new users with computational resources that are sufficient to meet the likely computational requirements of those new users. In particular, given a role within the enterprise that is assigned to a new user, the system may implement a machine learning algorithm to identify a set of computational resources that has a high likelihood of meeting the computational resource needs of the new user, as determined based on the computational resource usage of existing users assigned to the same role as the new user. Where the recommended set of computational resources includes a set of virtual desktop resources, the system may automatically provision such resources, thereby providing the new user with almost immediate access to the enterprise systems.

Certain embodiments may include none, some, or all of the above technical advantages. One or more other technical advantages may be readily apparent to one skilled in the art form the figures, descriptions, and claims included herein.

BRIEF DESCRIPTION OF THE DRAWINGS

For a more complete understanding of the present disclosure, reference is now made to the following description, taken in conjunction with the accompanying drawings, in which:

FIGS. 3A and 3B presents examples of two different distributed training schemes that may be used to train the machine learning algorithms used in the system of FIG. 1;

DETAILED DESCRIPTION

Embodiments of the present disclosure and its advantages may be understood by referring to FIGS. 1 through 5 of the drawings, like numerals being used for like and corresponding parts of the various drawings.

I. System Overview

Figure 1:
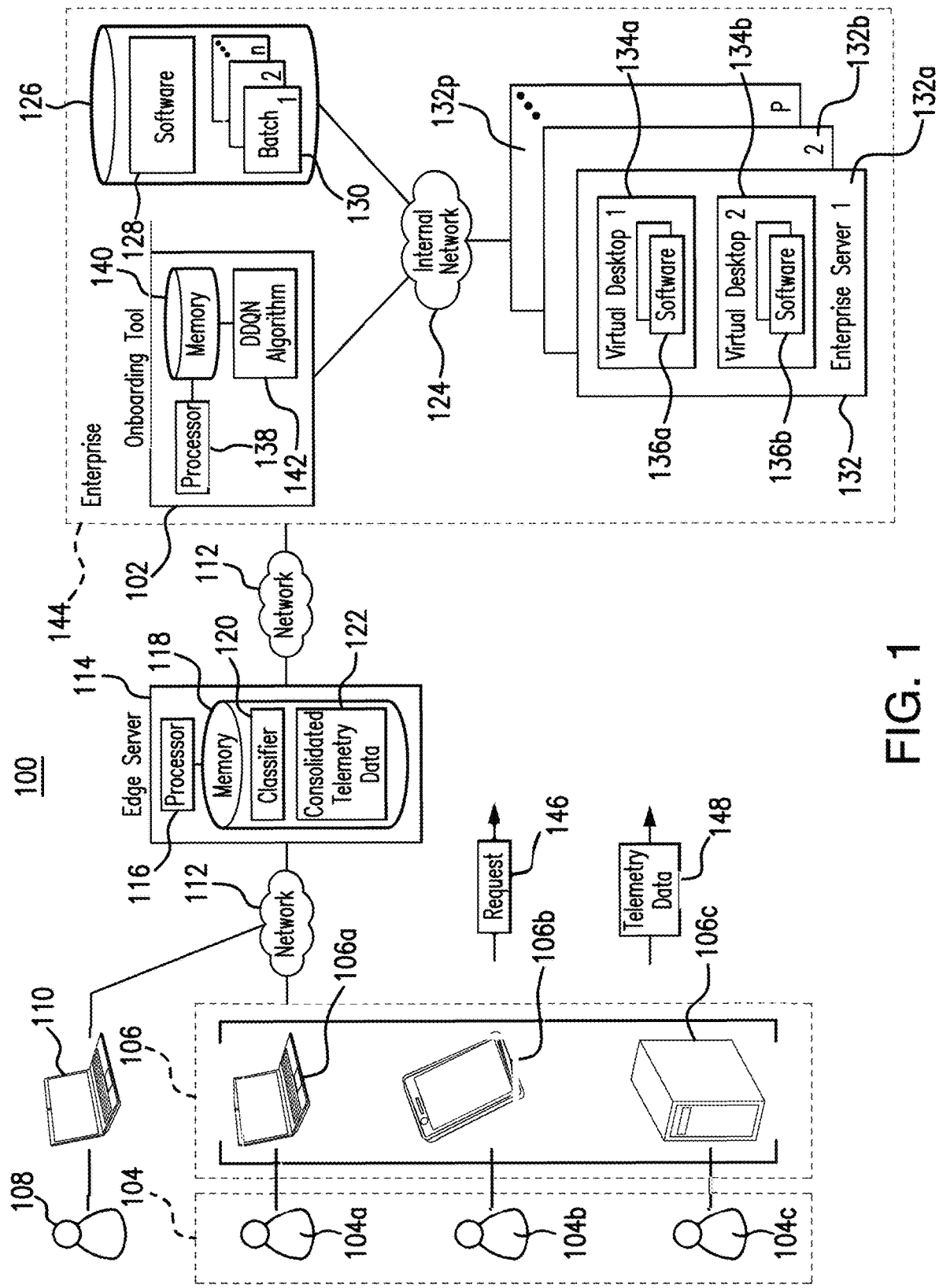
FIG. 1 illustrates an example onboarding system.

FIG. 1 illustrates an example onboarding system 100 that includes existing user(s) 104, device(s) 106 of existing user(s) 104, new user 108, device 110 of new user 108, external network 112, edge server 114, and enterprise systems 144. As illustrated in FIG. 1, enterprise systems 144 include onboarding tool 102, internal network 124, data storage 126, and enterprise server(s) 132. Generally, onboarding tool 102 receives a request 146 to provision a new user 108 with a set of computational resources (e.g., a set of hardware and/or software resources associated with device 110, and/or a set of virtual desktop resources 134 associated with enterprise server 132 and accessible through device 110). In response to receiving request 146, onboarding tool 102 executes machine learning algorithm 142 to generate a policy for the new user. The policy includes recommendations of hardware resources, virtual desktop resources, software resources, authentication protocols, authorization levels, and/or any other suitable computational resources to provision to the new user. Machine learning algorithm 142 is trained to generate the policy for the new user based on the computational resources used by existing users 104. Details of the manner by which machine learning algorithm 142 is trained to generate the policy are provided below, and in the discussion of FIGS. 2 through 4. In certain embodiments, in response to generating the policy for the new user, onboarding tool 102 provisions the recommended computational resources to the new user. As an example, in some embodiments, onboarding tool 102 provisions a set of virtual desktop resources 134 to new user 108. As another example, in certain embodiments, onboarding tool 102 transmits a message to a fulfillment system external to system 100, instructing the fulfillment system to ship a computer provisioned with the recommended computational resources to an address associated with the new user.

Devices 106 are used by users 104 located on network 112 to perform tasks associated with their roles within the enterprise to which enterprise systems 144 belong. For example, in embodiments in which users 104 are employees of the enterprise associated with enterprise systems 144, devices 106 may correspond to (1) enterprise devices provided to users 104 to perform employment related tasks, (2) personal devices belong to users 104 through which users 104 access a set of virtual desktop resources 134 of an enterprise server 134, or (3) a combination of the preceding.

In certain embodiments, each device 106 is configured to transmit telemetry data 148 to edge server 114. Telemetry data 148 may include any suitable information associated with device 106, including, for example, information associated with (1) the type of hardware included in device 106, (2) usage rates of the hardware included in device 106, (3) the operating system(s) installed on device 106, (4) the software programs installed on device 106, (5) the frequency with which the software programs installed on device 106 are used, (6) software libraries installed on device 106, (7) login attempts made using device 106, (8) type of user operating device 106 (e.g., normal, administrator, delegated user, etc.), (9) errors encountered by device 106 (e.g., program crashes, etc.), and/or (10) any other suitable information. In certain embodiments, telemetry data 148 transmitted by device 106 to edge server 114 includes an event log. While illustrated in FIG. 1 as devices 106 transmitting telemetry data 148, in certain embodiments, one or more of enterprise servers 132 may transmit telemetry data 148 to edge server 114. For example, consider a situation in which user 104*a* uses device 106*a* to access virtual desktop resources 134*a* on first enterprise server 132*a*. In some such situations, enterprise server 132*a* may generate telemetry data 148 based user 104*a*'s use of virtual resources 134*a* and transmit this data to edge server 114.

Device 110 is to be used by new user 108 located on network 112 to perform tasks associated with his/her newly assigned role within the enterprise to which onboarding tool 102 belongs, after new user 108 has been provisioned by onboarding tool 102 with a set of computational resources. In certain embodiments, device 110 is an existing device belonging to new user 108. In some such embodiments, provisioning new user 108 with computational resources may include enabling new user 108 to user device 110 to connect to enterprise systems 144, and providing new user 108 with access to a set of virtual desktop resources 134a within enterprise systems 144 through device 110. In other such embodiments, provisioning new user 108 with computational resources may include causing and/or allowing new device 110 to download and install a set of software 128 from enterprise systems 144. In certain embodiments, device 110 is a new device provisioned with computational resources for new user 108. For example, device 110 may include a computer equipped with a certain number of CPUs, a certain number of GPUs, a certain amount of memory, and/or a certain amount of storage space, on which is installed certain software. New user 108 may receive new device 110 from an external fulfillment service/system instructed by onboarding tool 102 to provision the device with a specific set of computational resources and to ship the provisioned device to user 108. In certain embodiments, once new device 110 has been provisioned with computational resources, it is configured to function in a similar manner to devices 106, described above.

Devices 106/110 include any appropriate device for communicating with components of system 100 over network 112. For example, devices 106/110 may include a telephone, a mobile phone, a computer, a laptop, a wireless or cellular telephone, a tablet, a server, an IoT device, and/or an automated assistant, among others. This disclosure contemplates devices 106/110 being any appropriate device for sending and receiving information over network 112. In certain embodiments, device 106/110 may include an integrated speaker and/or microphone. In some embodiments, an external speaker and/or microphone may be connected to device 106/110. Device 106/110 may also include any other suitable user interfaces, such as a display, a keypad, or other appropriate terminal equipment usable by user 104/108. In some embodiments, an application executed by a processor of device 106/110 may perform the functions described herein.

System 100 may include both an external network 112 and an internal network 124. Internal network 124 is associated with enterprise systems 144, and facilitates communications between components of enterprise system 144 including, for example, onboarding tool 102, data storage system 126, and enterprise servers 132. External network 112 facilitates communication between devices 106/110, edge server 114, and enterprise systems 144. External network 112 and/or internal network 124 may include any interconnecting systems capable of transmitting audio, video, signals, data, messages, or any combination of the preceding. For example, external network 124 may include all or a portion of a public switched telephone network (PSTN), a public data network, a metropolitan area network (MAN), a wide area network (WAN), a local, regional, or global communication or computer network, such as the Internet, a wireline or wireless network, or any other suitable communication link, including combinations thereof, operable to facilitate communication between devices 106/110 and edge server 114, between devices 106/110 and enterprise systems 114, and/or between edge server 114 and enterprise systems 144. Similarly, internal network 124 may include all or a portion of a private data network, a local area network (LAN), a metropolitan area network (MAN), a wide area network (WAN), a local or regional communication or computer network, a wireline or wireless network, an enterprise intranet, or any other suitable communication link, including combinations thereof, operable to facilitate communication between automated onboarding tool 102, data storage system 126, and/or enterprise servers 132. While illustrated in FIG. 1 and described above as being separate networks, in certain embodiments, network 112 and network 124 may correspond to the same network. For example, in certain embodiments, devices 106 may transmit telemetry data 148, for use in training machine learning algorithm 142, while connected directly to internal network 124 (e.g., while users 104 are located at the physical premises of the enterprise to which enterprise systems 144 belong). In such embodiments, network 112 and network 124 may both correspond to the enterprise's internal network. As another example, in certain embodiments, network 112 and network 124 may both correspond to an external network.

Figure 2:
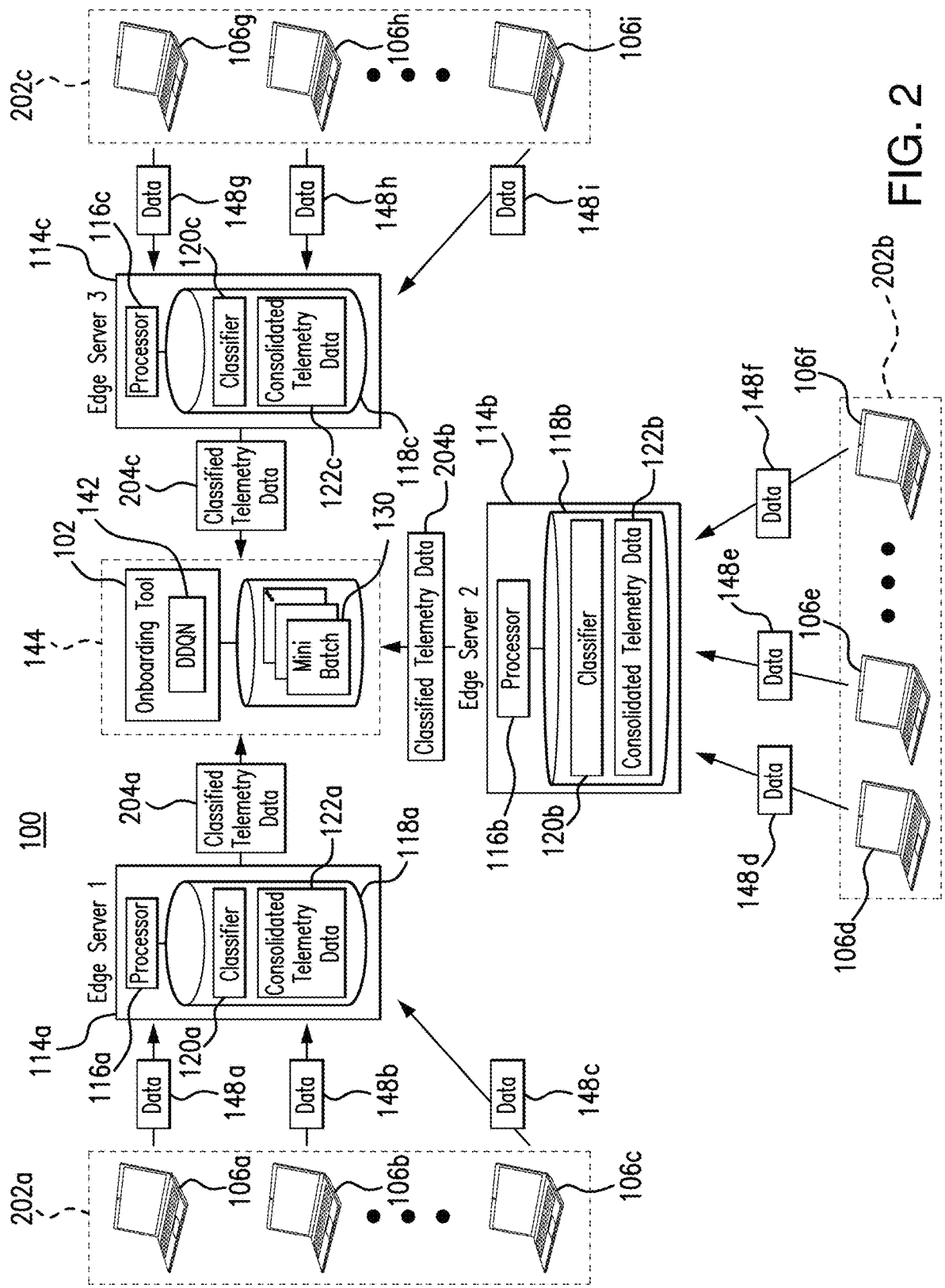
FIG. 2 illustrates an example of the use of edge servers to collect and process telemetry data for use by the onboarding tool of the system of FIG. 1.
Figure 3B:
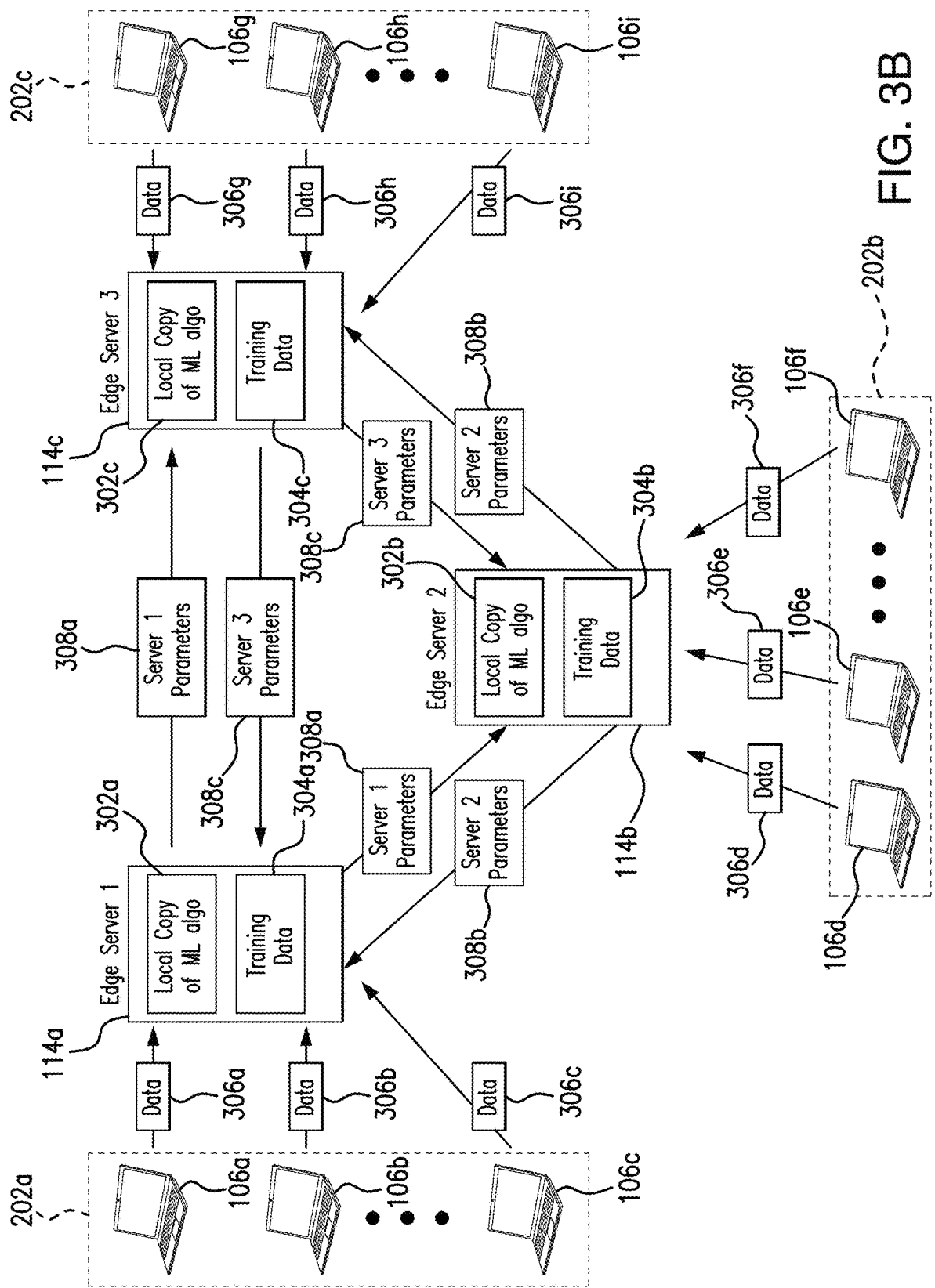

Edge server 144 is a computer system that exists separately from enterprise system 144. For example, in certain embodiments, edge server 114 is located at a geographical location such that devices 106 are located physically closer to edge server 114 than to enterprise systems 144, thereby enabling edge server 114 to receive and process data 148 from devices 106 more efficiently than if the data were sent to enterprise systems 144. As illustrated in FIG. 1, edge server 144 includes a processor 116 and a memory 118. This disclosure contemplates processor 116 and memory 118 being configured to perform any of the functions of edge server 114 described herein. Generally, edge server 114 is configured to receive telemetry data 148 from devices 106 and to consolidate and process the received data. While FIG. 1 illustrates, for simplicity, the use of a single edge server 114 configured to receive telemetry data 148 from a logical group of devices 106 that includes devices 106a through 106c, this disclosure contemplates that system 100 may include any number of edge servers 114, with each edge server 114 associated with a logical group of devices 106, and configured to receive telemetry data 148 from the devices included within its associated logical group. For example, FIGS. 2, 3A, and 3B illustrate examples in which system 100 includes a set of three edge servers 114.

Edge server 114 is configured to consolidate and process the received telemetry data 148 in any suitable manner. For example, in certain embodiments in which the telemetry data 148 received from device 106 takes the form of a log of information generated over time, consolidating the data may include: (1) averaging, (2) identifying maximum and/or minimum values, (3) calculating frequencies, and/or (4) implementing any other suitable consolidation method. As a specific example, where telemetry data 148 includes a log of the memory usage of device 106 over a period of time, edge server 114 may be configured to consolidate the data by determining the average memory usage and the maximum memory usage over that period of time. As another specific example, where telemetry data 148 includes a log identifying instances in which a certain software application was used over a period time, edge server 114 may be configured to consolidate the data by determining a frequency of use of the software application over the period of time. In certain embodiments, edge server 114 is configured to compress the telemetry data received from devices 106 after consolidating the data to generate consolidated telemetry data 122. As an example, in certain embodiments, edge server 114 is configured to compress consolidated telemetry data 122 by reducing a precision of the data. For instance, in certain embodiments in which telemetry data 148 is double precision data (e.g., 64 bits are used to represent each floating-point number), edge server 114 may be configured to compress the consolidated telemetry data 122 by storing it as single precision data (e.g., with 32 bits used to represent each floating-point number). As another example, in certain embodiments, edge server 114 is configured to compress consolidated telemetry data 122 by randomly deleting portions of the data. For example, edge server 114 may randomly delete all or a portion of the consolidated telemetry data received from a given device 106.

In response to consolidating and/or compressing telemetry data 148 received from devices 148, edge server 114 is configured to classify the consolidated data 122 into a set of categories. As an example, edge server 114 may be configured to classify consolidated data 122 into a set of categories that includes a hardware/software requirements category, a software usage category, a user profile category, an authentication/authorization protocol category, and/or any other suitable category. In particular, edge server 114 may be configured to classify portions of consolidated data 122 that are associated with the hardware/software requirements of a user 104*a* (e.g., information associated with the number of CPUs included in the user's device 106*a* and the usage of those CPUs, information associated with the number of GPUs included in device 106*a* and the usage of those GPUs, information associated with an amount of memory included in device 106*a* and the usage of that memory, information identifying an operating system installed on device 106*a*, etc.) into the hardware/software requirements category. Edge Server 114 may also be configured to classify portions of consolidated data 122 that are associated with a user 104*a*'s software usage (e.g., information identifying the software installed on device 106*a*, and the frequency with which user 104*a* uses the installed software, etc.) into the software usage category. Edge server 114 may also be configured to classify portions of consolidated data 122 that are associated with a profile of user 104*a* (e.g., information identifying a role of user 104*a* within the enterprise, information identifying a working group within the enterprise to which user 104*a* is assigned, etc.) into the user profile category. As a further example, edge server 114 may be configured to classify portions of consolidated data 122 that are associated with the authorization levels and/or authentication protocols assigned to user 104*a* (e.g., information identifying a level of access within a software program available to user 104*a*, information identifying a method of authenticating user 104*a* with enterprise system 144, etc.) into the authentication/authorization protocol category.

Edge server 114 may classify consolidated telemetry data in any suitable manner. For example, in certain embodiments, edge server 114 applies machine learning classification algorithm 120 to consolidated telemetry data 122 to classify the data into a set of categories, where classification algorithm 120 has previously been trained for this purpose. Classification algorithm 120 may be any suitable machine learning classification algorithm. For example, classification algorithm 120 may include a neural network algorithm, a k-nearest neighbors algorithm, a decision tree algorithm, a naïve bayes algorithm, a random forest algorithm, a stochastic gradient descent algorithm, and/or any other suitable machine learning algorithm. In certain embodiments, machine learning classification algorithm 120 is trained on a device/system separate from edge server 114. In other embodiments, edge server 114 is configured to train classification algorithm 120. Edge server 114 may train classification algorithm 120 in any suitable manner. As an example, edge server 114 may train classification algorithm 120 using one or more sets of labelled consolidated telemetry data. As another example, in certain embodiments in which system 100 includes multiple edge servers 114, these edge servers may cooperatively train classification algorithm 120 using data-parallel distributed training techniques. Further details and examples of the manner by which edge server(s) 114 may train classification algorithm 120 are presented below, in the discussion of FIGS. 3A and 3B.

After it has been classified, consolidated telemetry data 122 is used to train a reinforcement learning algorithm 142 to generate policies for new users 108. Each policy may include recommendations of hardware resources, virtual desktop resources, software resources, authentication protocols, authorization levels, and/or any other suitable computational resources to provision to a new user. In certain embodiments, edge server 114 transmits classified consolidated telemetry data 122 to onboarding tool 102 for use in training reinforcement learning algorithm 142. For example, edge server 114 may transmit classified and consolidated telemetry data 122 to onboarding tool 102 as a batch 130 of training data.

In certain embodiments, edge server 114 is configured to employ a communication synchronization scheme while receiving and processing telemetry data 148. For example, in certain embodiments, edge server 114 is configured to wait until it has received telemetry data 148 from each of devices 106*a* through 106*c* prior to consolidating, compressing, and/or classifying the data. As another example, in some embodiments, edge server 114 is configured to wait until it has received telemetry data 148 from each of devices 106*a* through 106*c* prior to transmitting the classified and consolidated data 122 to onboarding tool 102 for use in training reinforcement learning algorithm 142. For example, edge server 114 may consolidate, compress, and/or classify telemetry data 148 received from a first device 106*a*, while waiting to receive telemetry data 148 from a second device 106*b*. As a further example, in some embodiments, edge server 114 is configured to implement an asynchronous communication synchronization scheme—e.g., edge server 114 may be configured to transmit portions of classified and consolidated telemetry data 122 to onboarding tool 102 as soon as they are generated. For example, in response to consolidating, compressing, and classifying telemetry data 148 received from a first device 106*a*, edge server 114 may transmit the classified and consolidated data to onboarding tool 102 even if the server has not yet received and/or finished receiving telemetry data 148 from a second device 106*b*.

Processor 116 is any electronic circuitry, including, but not limited to central processing units (CPUs), graphics processing units (GPUs), microprocessors, application specific integrated circuits (ASIC), application specific instruction set processor (ASIP), and/or state machines, that communicatively couples to memory 118 and controls the operation of edge server 114. Processor 116 may be 8-bit, 16-bit, 32-bit, 64-bit or of any other suitable architecture. Processor 116 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. Processor 116 may include other hardware and software that operates to control and process information.

Processor 116 executes software stored on memory 118 to perform any of the functions described herein. Processor 116 controls the operation and administration of edge server 114 by processing information received from device(s) 106, other edge servers 114, onboarding tool 102, and/or memory 118. Processor 116 may be a programmable logic device, a microcontroller, a microprocessor, any suitable processing device, or any suitable combination of the preceding. Processor 116 is not limited to a single processing device and may encompass multiple processing devices.

Memory 118 may store, either permanently or temporarily, data, operational software, or other information for processor 116. Memory 118 may include any one or a combination of volatile or non-volatile local or remote devices suitable for storing information. For example, memory 118 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in memory 118, a disk, a CD, or a flash drive. In particular embodiments, the software may include an application executable by processor 116 to perform one or more of the functions described herein.

As illustrated in FIG. 1, enterprise system 144 includes onboarding tool 102, data storage system 126, and enterprise servers 132, in communication with one another over internal network 124. Enterprise system 144 is used by an enterprise to provide computational resources to users 104 who are associated with the enterprise (e.g., employees of the enterprise).

Onboarding tool 102 includes processor 138 and memory 140. This disclosure contemplates processor 138 and memory 140 being configured to perform any of the functions of onboarding tool 102 described herein. Generally onboarding tool 102 (1) uses classified and consolidated telemetry data 122 and/or data derived from classified and consolidated telemetry data 122 to train reinforcement learning algorithm 142, (2) receives requests 146 to provision new users 108 with computational resources, and (3) uses the trained reinforcement learning algorithm 142 to generate policies for new users 108, where each policy includes recommendations of hardware resources, virtual desktop resources, software resources, authentication protocols, authorization levels, and/or any other suitable computational resources to provision to the corresponding new user 108. The manner by which onboarding tool 102 performs these functions is described in detail below, in the discussion of FIGS. 2 through 5.

Processor 138 is any electronic circuitry, including, but not limited to central processing units (CPUs), graphics processing units (GPUs), microprocessors, application specific integrated circuits (ASIC), application specific instruction set processor (ASIP), and/or state machines, that communicatively couples to memory 140 and controls the operation of onboarding tool 102. Processor 138 may be 8-bit, 16-bit, 32-bit, 64-bit or of any other suitable architecture. Processor 138 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. Processor 138 may include other hardware and software that operates to control and process information.

Processor 138 executes software stored on memory 140 to perform any of the functions described herein. Processor 138 controls the operation and administration of onboarding tool 102 by processing information received from device(s) 106, edge server(s) 114, data storage system 124, enterprise servers 132, and/or memory 140. Processor 138 may be a programmable logic device, a microcontroller, a microprocessor, any suitable processing device, or any suitable combination of the preceding. Processor 138 is not limited to a single processing device and may encompass multiple processing devices.

Memory 140 may store, either permanently or temporarily, data, operational software, or other information for processor 138. Memory 140 may include any one or a combination of volatile or non-volatile local or remote devices suitable for storing information. For example, memory 140 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in memory 140, a disk, a CD, or a flash drive. In particular embodiments, the software may include an application executable by processor 138 to perform one or more of the functions described herein.

In certain embodiments, memory 140 may also store reinforcement learning algorithm 142. Reinforcement learning algorithm 142 is configured to generate a policy for a new user 108, based on at least on a role within the enterprise that is assigned to the new user. The policy includes recommendations of hardware resources, virtual desktop resources, software resources, authentication protocols, authorization levels, and/or any other suitable computational resources to provision to the new user. In particular, reinforcement learning algorithm 142 is associated with an agent that is configured to generate an action based on a given environmental state. For example, in certain embodiments, reinforcement learning algorithm 142 is configured to generate an action, in the form of a recommendation of one or more computational resources (e.g., hardware, software, authorization levels, authentication protocols, etc.) to provision to a new user, based on a state that describes the new user (e.g., identifies a role of the new user within the enterprise, identifies a working group associated with the new user, identifies computational resources previously provisioned to the new user, etc.). Onboarding tool 102 may generate a policy for the new user, based on repeated applications of reinforcement learning algorithm 142. As a specific example, reinforcement learning algorithm 142 may be used to generate a policy for a new user 108 who is assigned to a first role within the enterprise by: (1) applying reinforcement learning algorithm 142 to a first state, which identifies the first role and indicates that new user 108 has not yet been provisioned with any computational resources, to generate a first action, which includes a recommendation of a first hardware resource (e.g., a number of CPUs) to provision to the new user; (2) applying the first action to the first state to generate a second state, which identifies the first role and the first hardware resource; (3) applying reinforcement learning algorithm 142 to the second state to generate a second action, which includes a recommendation of a second hardware resource (e.g., an amount of memory) to provision to the new user; (4) applying the second action to the second state to generate a third state, which identifies the first role, and the first and second hardware resources; (5)

applying the reinforcement learning algorithm 142 to the third state to generate a third action, which includes a recommendation of a software program to provision to the new user, etc. In this manner, onboarding tool 102 may use reinforcement learning algorithm 142 to generate a series of actions, which defines the policy for the new user 108.

Reinforcement learning algorithm 142 may be any suitable reinforcement learning algorithm. As an example, in certain embodiments, reinforcement learning algorithm 142 is a deep Q reinforcement learning (DQN) algorithm, a double deep Q reinforcement learning (DDQN) algorithm, a deep deterministic policy gradient (DDPG) algorithm, and/or any other suitable reinforcement learning algorithm. Reinforcement learning algorithm 142 may be trained to generate policies for new users 108 in any suitable manner. For example, in certain embodiments, onboarding tool 102 and/or edge server(s) 114 are configured to use the classified and consolidated telemetry data 122 obtained by edge server(s) 114 to train reinforcement learning algorithm 142 to generate optimal policies for new users 108, as measured by the alignment of the generated policies with the computational resources used by existing users 106 who are assigned the same/similar roles. Further details and examples of the manner by which onboarding tool 102 and/or edge server(s) 114 may train reinforcement learning algorithm 142 are presented below, in the discussion of FIGS. 2, and 3A-3B.

Data storage system 126 includes any storage location within enterprise system 144 where data may be stored. For example, data storage system 126 may correspond to a database, a server, and/or any other suitable storage location. Data storage system 126 may store software 128 and/or batches 130 of training data. Software 128 may include software programs, software libraries, software packages, operating systems, and/or any other suitable software that may be used by one or more of users 104. In certain embodiments, one or more pieces of software 128 may be associated with a set of authorization levels. For example, a first user 104a may be assigned a first authorization level for use with a given software program, and a second user 104b may be assigned a second authorization level that is higher than the first authorization level for use with the software program. The second authorization level may allow access to certain features of the software program that are not provided to users assigned to the first authorization level.

In certain embodiments, users 104 may execute software 128 on enterprise system 144. For example, one or more users 104 may run virtual desktops on their devices 106, through which the users may access to a set of computational resources that have been provisioned to them on one or more enterprise servers 132. Such computational resources may include one or more software programs 136a/136b that have been installed on the enterprise servers. In some embodiments, users 104 may execute software 128 on devices 104. For example, in response to generating a policy for a new user 108 that specifies a set of software 128 that should be provided to the new user, onboarding tool 102 may transmit the corresponding software 128 to device 110.

Batches of training data 130 may include data transmitted by edge server(s) 114 to enterprise system 144 for use in training/updating reinforcement learning algorithm 142. For example, in certain embodiments, and described in further detail below, in the discussion of FIG. 2, a batch of training data 130 includes classified and consolidated telemetry data 122. In certain embodiments, a batch of training data 130 includes all or a portion of the classified and consolidated telemetry data 122 received from edge server 114. For example, in certain embodiments that include multiple edge servers 114, each batch 130 may be received from a different edge server 114, and correspond to a set of classified and consolidated telemetry data 122 transmitted by that server.

Enterprise servers 132 include any computational resources offered by enterprise system 144 for use by users 104. For example, a given user 104a who has been provisioned with a set of virtual desktop resources 134a on an enterprise server 132a, may access the virtual desktop resources 134a through a virtual desktop displayed on his/her device 104a, thereby enabling the user to use execute software 136b on the enterprise server, while nevertheless located at a remote location from the server. In certain embodiments, enterprise servers 132 are configured to generate telemetry data associated with the use of virtual desktop resources 134. For example, first server 132a may generate a first set of telemetry data associated with the use of the first set of virtual desktop resources 134a, and a second set of telemetry data associated with the use of the second set of virtual desktop resources 134b.

Modifications, additions, or omissions may be made to the systems described herein without departing from the scope of the invention. For example, system 100 may include any number of existing users 104, devices 106, new users 108, new devices 110, external networks 112, edge servers 114, internal networks 124, data storage systems 126, enterprise servers 132, virtual desktop resources 134, processors 138, memories 140, machine learning classification algorithms 120, and/or reinforcement learning algorithms 142. The components may be integrated or separated. Moreover, the operations may be performed by more, fewer, or other components. Additionally, the operations may be performed using any suitable logic comprising software, hardware, and/or other logic.

II. Distributed Data Collection

FIG. 2 illustrates the distributed nature of the data collection process by which a set of edge servers 114 are used to collect telemetry data 138 from devices 106 for use in training reinforcement learning algorithm 142. While FIG. 2 illustrates the use of three edge servers 114a through 114c, this disclosure contemplates that system 100 may include any number of edge servers.

As illustrated in FIG. 2, each edge server 114 is assigned to a logical group 202 of devices 106. For example, first edge server 114a is assigned to logical group 202a, which includes devices 106a through 106c, second edge server 114b is assigned to logical group 202b, which includes devices 106d through 106f, and third edge server 114c is assigned to logical group 202c, which includes devices 106g through 106i. Each logical group 202 may include any number of devices 106. Each device 106 may be assigned to a given logical group 202 in any suitable manner. For example, in certain embodiments, each device 106 is assigned to a given logical group 202 based on the geographical location of the device.

Each edge server 114 is configured to receive telemetry data 148 from the devices 106 assigned to its logical group 202. For example, first edge server 114a is configured to receive telemetry data 148a through 148c from devices 106a through 106c, second edge server 114b is configured to receive telemetry data 148d through 148f from devices 106d through 106f, and third edge server 114c is configured to receive telemetry data 148g through 148i from devices 106g through 106i. As described above, in the discussion of edge server 114 displayed in FIG. 1, in response to receiving telemetry data 148, each edge server 114 is configured to consolidate and/or compress the received telemetry data 148, and apply machine learning classification algorithm 120 to the consolidated and/or compressed telemetry data 122, to generate classified telemetry data 204. In certain embodiments, each edge server 114 transmits classified telemetry data 204 to onboarding tool 102 for use in training reinforcement learning algorithm 142, as discussed in Section III, below.

In certain embodiments, each edge server 114 is configured to employ a communication synchronization scheme while receiving and processing telemetry data 148 for devices 106 assigned to its logical group 202. For example, in certain embodiments, edge server 114a is configured to wait until it has received telemetry data 148a through 148c from each of devices 106a through 106c prior to consolidating, compressing, and/or classifying the data. As another example, in some embodiments, edge server 114a is configured to wait until it has received telemetry data 148a through 148c from each of devices 106a through 106c prior to transmitting the classified and consolidated data 122a to onboarding tool 102 for use in training reinforcement learning algorithm 142. For example, edge server 114a may consolidate, compress, and/or classify telemetry data 148a received from first device 106a, while waiting to receive telemetry data 148b from second device 106b. As a further example, in some embodiments, each edge server 114 is configured to implement an asynchronous communication synchronization scheme—e.g., edge server 114a may be configured to transmit portions of classified and consolidated telemetry data 122a to onboarding tool 102 as soon as they are generated. For example, in response to consolidating, compressing, and classifying telemetry data 148a received from first device 106a, edge server 114a may transmit the classified and consolidated data to onboarding tool 102 even if the server has not yet received and/or finished receiving telemetry data 148b from second device 106b.

III. Training the Machine Learning Algorithms a. Serial Training

As illustrated in FIG. 2, in certain embodiments, onboarding tool 102 is configured to train reinforcement learning algorithm 142 using classified telemetry data 204a through 204c received from edge servers 114a through 114c. For example, in certain embodiments, enterprise system 144 stores each received set of classified telemetry data 204 as a batch 130 of training data. Onboarding tool 102 then serially uses each batch 130 of training data to train reinforcement learning algorithm 142.

Batches 130 of training data may be used to train reinforcement learning algorithm 142 in any suitable manner. For instance, for a given user role identified in a batch 130 of training data, training reinforcement learning algorithm 142 may include the following steps: (1) generating a first state, which includes an identification of the given user role; (2) applying reinforcement learning algorithm 142 to the first state, to generate a first action that includes a recommendation of a computational resource to provision to a new user who is assigned to the given user role; (3) calculating a measure of alignment between the computational resource recommendation generated by the first action and the training data in the batch 130 that is associated with the given role; (4) using the calculated measure of alignment to generate a reward value, where a positive reward value indicates that the first action agrees with and/or is consistent with the information in batch 130 that is associated with the given role, and a negative reward value indicates that the first action does not agree with and/or is inconsistent with the information in batch 130; and (5) using the reward value to refine reinforcement learning algorithm 142. If the reward value that was generated was positive, first state may be updated based on the first action, and the above set of steps may be repeated for the updated state. On the other hand, if the reward value that was generated was negative, the first action is not used to update the first state, and the above set of steps may be repeated for the first state. These steps may be repeated any suitable number of times.

The measure of alignment calculated between a computational resource recommendation generated as an action by reinforcement learning algorithm 142 and the information stored in a batch 130 of training data may be any suitable measure. As an example, the measure of alignment may take a binary form, in which a reward value of +1 is provided if the action generated for a given role agrees with and/or is consistent with the information in batch 130 that is associated with the given role, while a reward value of −1 is provided if the action generated for a given role does not agree with and/or is inconsistent with the information in batch 130 that is associated with the given role. For example, consider a batch 130 of training data that includes an identification of a first role, and an indication that a user assigned to the first role uses a laptop computer provisioned with four CPU cores. If the action generated by reinforcement learning algorithm 142 for a state that identifies the first role and the use of a laptop, includes a recommendation that the laptop be provisioned with a single CPU, which does not align with the user of a laptop provisioned with four CPU cores by a user assigned to the first role. Accordingly, a reward value of −1 may be used to update reinforcement learning algorithm 142. As another example, the measure of alignment may correspond to a function that depends on, for example, the frequency of use of the computational resources, or any other suitable factor. For example, the function may generate a larger reward value for recommending, to a new user who is assigned to a given role, a software program that is used multiple times a day by existing users who are assigned that same role, than for recommending a software program that is used infrequently.

b. Parallel Training

As described above, in certain embodiments, onboarding tool 102 is used to train reinforcement learning algorithm 142 by considering each batch 130 of training data received from edge servers 114 in turn. In certain embodiments, in order to accelerate the training process, edge servers 114 may also be used to aid in the training process.

FIGS. 3A and 3B illustrate example distributed training methods that may be used to efficiently train a machine learning algorithm. Because, in certain embodiments, the distributed training methods illustrated in FIGS. 3A and 3B may be used to train reinforcement learning algorithm 142 and/or machine learning classification algorithm 120, FIGS. 3A and 3B present depictions of distributed training on a generic machine learning algorithm, which is meant to represent either reinforcement learning algorithm 142 or machine learning classification algorithm 120.

FIG. 3A illustrates a first example of a distributed training method. As illustrated in FIG. 3A, each edge server 114 stores a local copy 302 of the machine learning algorithm 310. In response to generating a set of training data 304 (e.g., consolidated telemetry data 122 for the case of reinforcement learning classification algorithm 120, and labelled consolidated telemetry data for the case of machine learning classification algorithm 120) from data 306 received from devices 106 belonging to its logical group 202, each edge server 114 uses all, or a portion of its training data to update its local copy 302 of machine learning algorithm 310. For example, in response to generating training data 304a, edge server 114a uses all or a portion of training data 304a to update local copy 302a, in response to generating training data 304b, edge server 114b uses all or a portion of training data 304b to update local copy 302b, and in response to generating training data 304c, edge server 114c uses all or a portion of training data 304c to update local copy 302c. Each edge server 114 then sends the updated parameters 308 associated with its local copy 302 of machine learning algorithm 310 to onboarding tool 102. Onboarding tool 102 uses the received parameters 308a through 308c to update a global copy of the machine learning algorithm 310 stored in memory 140. Once the global copy of the machine learning algorithm 310 has been updated, onboarding tool 102 transmits the updated parameters of the global copy back to each of edge servers 114. This process may repeat any number of times until machine learning algorithm 310 is suitably trained.

In certain embodiments, a communication synchronization scheme is used by edge servers 114 in transmitting updated parameters 308 to onboarding tool 102. For example, in certain embodiments, one of a synchronous communication synchronization scheme, a stale-synchronous communication synchronization scheme, an asynchronous communication synchronization scheme, and a local stochastic gradient descent communication synchronization scheme may be used to transmit updated parameters 308 to onboarding tool 102.

FIG. 3B presents a similar distributed training method, but one which does not rely on onboarding tool 102 to update the global copy of machine learning algorithm 310. Rather, in response to using all or a portion of its training data 304 to update its local copy 302 of machine learning algorithm 310, each edge server 114 transmits its updated parameters 308 to the other edge servers. For example, first edge server 114a transmits its updated parameters 308a to second edge server 114b and third edge server 114c, second edge server 114b transmits its updated parameters 308b to first edge server 114a and third edge server 114c, and third edge server 114c transmits its updated parameters 308c to first edge server 114a and second edge server 114b. Each edge server 114 then uses the updated parameters 308 that it receives from the other edge servers to update its local copy 302 of machine learning algorithm 310. For example, first edge server 114a uses parameters 308b and 308c to update local copy 302a, second edge server 114b uses parameters 308a and 308c to update local copy 302b, and third edge server 114c uses parameters 308a and 308b to update local copy 302c.

Figure 4:
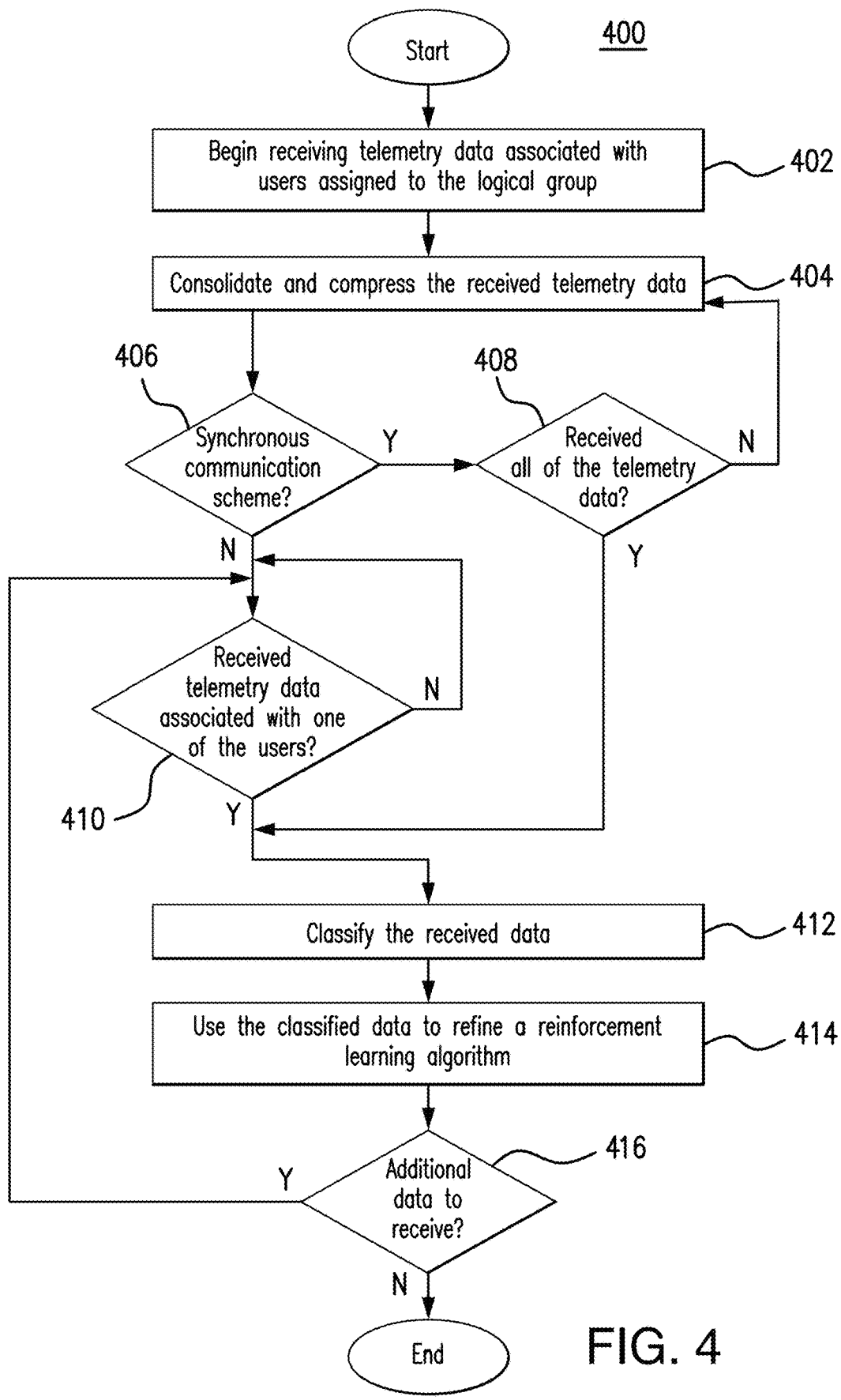
FIG. 4 presents a flowchart illustrating an example method by which an edge server collects and processes telemetry data gathering from existing users, for use in training the machine learning algorithms of the system of FIG. 1.

IV. Method for Training a Reinforcement Learning Algorithm to Optimally Provision Computational Resources to New Users FIG. 4 presents a flowchart illustrating an example method 400 (described in conjunction with elements of FIGS. 1 and 2) used by an edge server 114 as part of the process for training reinforcement learning algorithm 142.

In step 402, edge server 114 begins receiving telemetry data 148 from user devices 106 belonging to the logical group 202 assigned to the edge server. In step 404, edge server 114 consolidates and compresses the telemetry data it has received. In step 406, edge server 114 determines whether it is employing a synchronous communications synchronization scheme. If, in step 406 edge server 114 determines that it is employing a synchronous communication synchronization scheme, in step 408 edge server 114 determines whether it has finished receiving telemetry data 148 from all of user devices 106. If, in step 408 edge server 114 determines that it has not yet received telemetry data 148 from all of user devices 106, method 400 returns to step 404. If, in step 408 edge server 114 determines that it has finished receiving telemetry data 148 from all of user devices 106, method 400 proceeds to step 412.

If, in step 406 edge server 114 determines that it is not employing a synchronous communication synchronization scheme, in step 410 edge server 114 determines whether it has finished receiving telemetry data 148 from at least one of devices 106. If, in step 410 edge server 114 determines that it has finished receiving telemetry data form at least one of devices 106, method 400 proceeds to step 412.

In step 412 edge server 114 compresses and classifies the telemetry data that it has received. In step 414 the classified and compressed telemetry data is used to refine reinforcement learning algorithm 142. In step 416 edge server 114 determines there is additional telemetry data for it to receive and/or if there is additional received telemetry data for it to process. If, in step 416 edge server 114 determines that there is additional telemetry data for it to receive and/or that there is additional received telemetry data for it to process, method 400 returns to step 410.

Modifications, additions, or omissions may be made to method 400 depicted in FIG. 4. Method 400 may include more, fewer, or other steps. For example, steps may be performed in parallel or in any suitable order. While discussed as edge server 114 (or components thereof) performing certain steps, any suitable components of system 100, including, for example, onboarding tool 102, may perform one or more steps of the method.

V. Method for Using a Reinforcement Learning Algorithm to Optimally Provision Computational Resources to New Users FIG. 5 presents a flowchart illustrating an example method 500 (described in conjunction with elements of FIGS. 1 and 2) used by onboarding tool 102 to identify a set of computational resources to provision to a new user 108, who is assigned to a given role within the enterprise to which enterprise system 144 belongs.

In step 502, onboarding tool 102 determines if it has received a request 146 to onboard a new user 108 to enterprise system 144, by provisioning the new user with computational resources. If, in step 502 onboarding tool 102 determines that it has received a request 146 to onboard a new user 108, in step 504 onboarding tool 102 initializes a state that is associated with the new user. For example, onboarding tool 102 may initialize a state that indicates that new user is assigned the given role within the enterprise. In step 506 onboarding tool 102 applies reinforcement learning algorithm 142 to the state to generate a recommendation associated with a computational resource. The recommendation may include a recommendation to provision the user with the computational resource, a recommendation to provide the user with an authentication protocol for use with the computational resource, and/or a recommendation to assign a particular software access level to the user. In step 508 onboarding tool 102 updates the state associated with the new user based on the recommendation. For example, onboarding tool 102 updates the state associated with the user to indicate that the user has been provisioned with a computation resource, provided with an authentication protocol, and/or assigned a particular software access level in accordance with the recommendation. In step 510 onboarding tool 102 determines whether to provision the new user with any additional computational resources. This decision may be made by onboarding tool 102 in any suitable manner. For example, in certain embodiments, onboarding tool 102 may make the decision based on the number and/or type of computational resources already recommended for the new user. If, in step 510 onboarding tool 102 determines to provision additional computational resources to new user 108, method 500 returns to step 506.

If, in step 510 onboarding tool 102 determines not to provision new user 108 with any additional computational resources, in step 512 onboarding tool 102 generates a policy for the user, based on the recommendations generated by reinforcement learning algorithm 142. In step 514 onboarding tool 102 provisions new user 108 with computational resources according to the policy. For example, in accordance with the policy generated by reinforcement learning algorithm 142, onboarding tool 102 may provide new user 108 with access to a set of virtual desktop resources 134, onboarding tool 102 may instruct an external fulfillment service to ship a computer 110 to new user 108, and/or onboarding tool 102 may transmit software 128 to an existing device 110 of new user 108.

Figure 5:
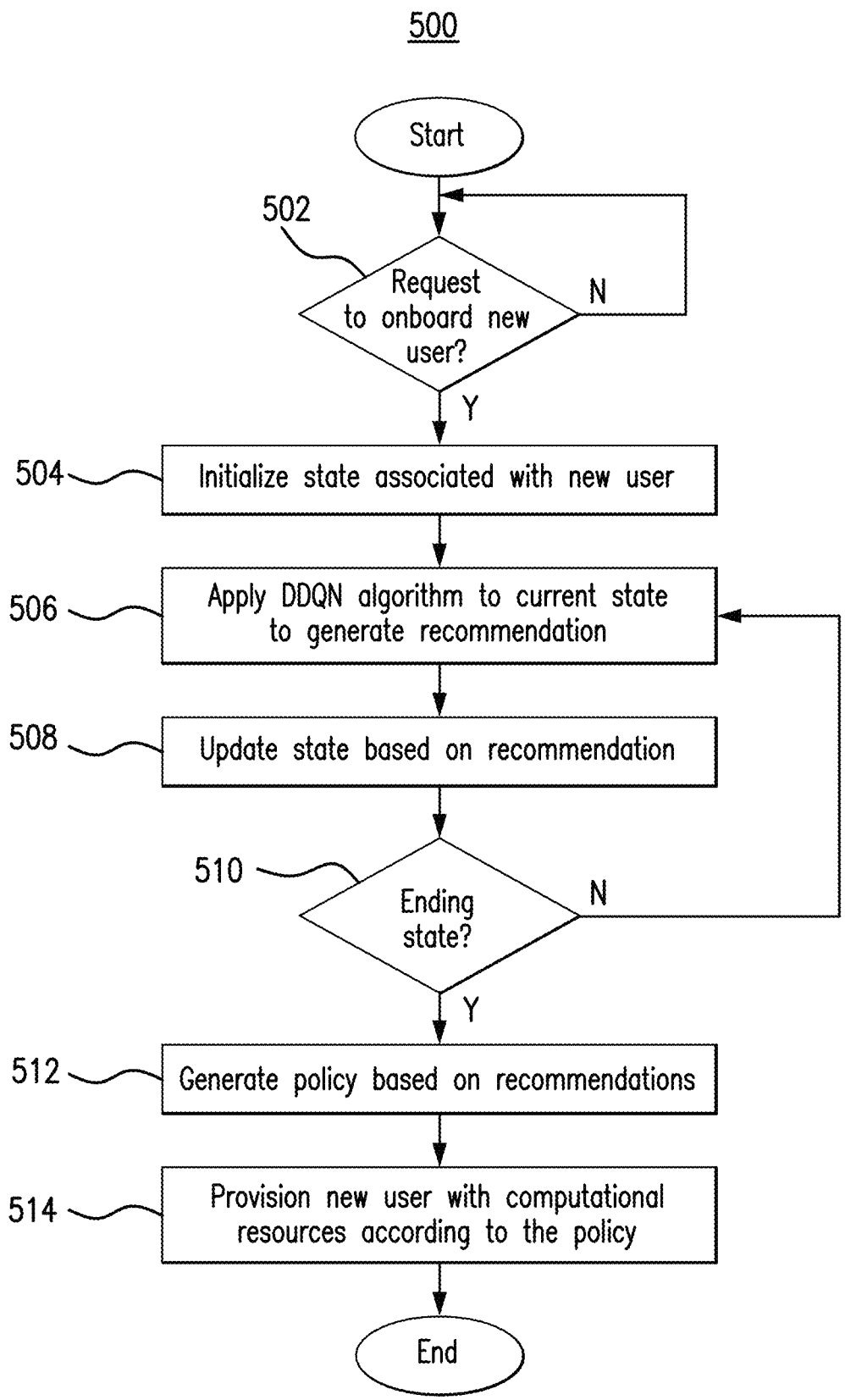
FIG. 5 presents a flowchart illustrating an example method by which the onboarding tool of the system of FIG. 1 generates a set of recommendations of computational resources with which to provision a new user.

Modifications, additions, or omissions may be made to method 500 depicted in FIG. 5. Method 500 may include more, fewer, or other steps. For example, steps may be performed in parallel or in any suitable order. While discussed as onboarding tool 102 (or components thereof) performing certain steps, any suitable components of system 100, including, for example, edge servers 114, may perform one or more steps of the method.

Although the present disclosure includes several embodiments, a myriad of changes, variations, alterations, transformations, and modifications may be suggested to one skilled in the art, and it is intended that the present disclosure encompass such changes, variations, alterations, transformations, and modifications as falling within the scope of the appended claims.

What is claimed is:

1. An system comprising:
a first server configured to:
receive a first set of telemetry data from a first device associated with a first user;
consolidate the first set of telemetry data, wherein consolidating the first set of telemetry data comprises averaging or calculating frequencies;
compress the consolidated first set of telemetry data, wherein compressing the consolidated first set of telemetry data comprises reducing a precision of the consolidated first set of telemetry data; and
generate, based on the compressed and consolidated first set of telemetry data, a set of information associated with the first user; and
a second server communicatively coupled to the first server, wherein the second server comprises:
a memory configured to store a deep Q reinforcement learning (DQN) algorithm configured, when executed by a hardware processor, to generate an action of a plurality of actions, based on a state of a plurality of states, wherein:
each action of the plurality of actions comprises a recommendation associated with a computational resource of a set of computational resources; and
each state of the plurality of states comprises at least an identification of a role of a plurality of roles within an enterprise; and
a hardware processor communicatively coupled to the memory, the hardware processor configured to:
receive the set of information associated with the first user, the set of information comprising:
an identification of a first role of the plurality of roles assigned to the first user; and
computational resource information associated with the first user, the computational resource information comprising information associated with a set of computational resources provisioned to the first user, wherein receiving the set of information associated with the first user comprises receiving a batch of information associated with a plurality of users comprising the first user, the batch of information comprising the set of information associated with the first user;
apply the DQN algorithm to a first state of the plurality of states, to generate a first action of the plurality of actions, the first state comprising an identification of the first role assigned to the first user, the first action comprising a first recommendation associated with a first computational resource of the set of computational resources;
in response to applying the DQN algorithm to the first state to generate the first action:
determine whether the first recommendation aligns with the computational resource information associated with the first user;
generate a reward value, wherein:
the reward value comprises a positive value, in response to determining that the first recommendation aligns with the computational resource information associated with the first user; and
the reward value comprises a negative value, in response to determining that the first recommendation does not align with the computational resource information associated with the first user; and
use the reward value to update the DQN algorithm;
generate a policy comprising at least the first recommendation, wherein the policy includes recommendations of hardware resources, virtual desktop resources, software resources, authentication protocols, and/or authorization levels to provision to a new user assigned to the first role; and
provision the new user assigned to the first role with at least the first computational resource according to the policy.

2. The system of claim 1, wherein the DQN algorithm comprises a double DQN algorithm.

3. The system of claim 1, wherein each action of the plurality of actions comprises a recommendation of at least one of hardware, software, an authorization level, and an authentication protocol.

4. The system of claim 1, wherein:
the reward value comprises a positive value; and
in response to using the reward value to update the DQN algorithm, the hardware processor is further configured to:
apply the DQN algorithm to a second state of the plurality of state, to generate a second action of the plurality of actions, wherein:
the second state comprises the identification of the first role assigned to the first user and an identification of the first computational resource of the set of computational resources; and
the second action comprises a second recommendation associated with a second computational resource of the set of computational resources; and in response to applying the DQN algorithm to the second state to generate the second action:
  determine whether the second recommendation aligns with the computational resource information associated with the first user;
  generate a second reward value, wherein:
    the second reward value comprises a second positive value, in response to determining that the second recommendation aligns with the computational resource information associated with the first user; and
    the second reward value comprises a second negative value, in response to determining that the second recommendation does not align with the computational resource information associated with the first user; and
  use the second reward value to update the DQN algorithm.

5. The system of claim 4, wherein:
the first recommendation comprises a recommendation to provision the new user assigned to the first role with at least one of a laptop, a desktop computer, and a set of virtual desktop resources; and
the second recommendation comprises a recommendation to provision the new user with an operating system installed on the at least one of the laptop, the desktop computer, and the set of virtual desktop resources.

6. The system of claim 1, wherein the batch of information further comprises a set of information associated with a second user, the set of information associated with the second user comprising:
  an identification of a second role within the enterprise assigned to the second user; and
  second computational resource information associated with the second user, the second computational resource information comprising information associated with a set of computational resources provisioned to the second user; and
  the hardware processor is further configured to:
    apply the DQN algorithm to a second state of the plurality of states, to generate a second action of the plurality of actions, the second state comprising an identification of the second role assigned to the second user, the second action comprising a second recommendation associated with a second computational resource of the set of computational resources; and
    in response to applying the DQN algorithm to the second state to generate the second action:
      determine whether the second recommendation aligns with the second computational resource information associated with the second user;
      generate a second reward value, wherein:
        the second reward value comprises a second positive value, in response to determining that the second recommendation aligns with the second computational resource information associated with the second user; and
        the second reward value comprises a second negative value, in response to determining that the second recommendation does not align with the second computational resource information associated with the second user; and
      use the second reward value to update the DQN algorithm.

7. The system of claim 6, wherein the second server is further configured to:
  receive a second set of telemetry data from a second device associated with the second user; and
  generate, based on the second set of telemetry data, the set of information associated with the second user.

8. A method comprising:
receiving a first set of telemetry data from a first device associated with a first user;
consolidating the first set of telemetry data, wherein consolidating the first set of telemetry data comprises averaging or calculating frequencies;
compressing the consolidated first set of telemetry data, wherein compressing the consolidated first set of telemetry data comprises reducing a precision of the consolidated first set of telemetry data;
generating, based on the compressed and consolidated first set of telemetry data, a set of information associated with the first user, the set of information comprising:
  an identification of a first role of a plurality of roles assigned to the first user; and
  computational resource information associated with the first user, the computational resource information comprising information associated with a set of computational resources provisioned to the first user, wherein receiving the set of information associated with the first user comprises receiving a batch of information associated with a plurality of users comprising the first user, the batch of information comprising the set of information associated with the first user;
applying a deep Q reinforcement learning (DQN) algorithm to a first state of a plurality of states, to generate a first action of a plurality of actions, the first state comprising an identification of the first role assigned to the first user, the first action comprising a first recommendation associated with a first computational resource of a set of computational resources;
in response to applying the DQN algorithm to the first state to generate the first action:
  determining whether the first recommendation aligns with the computational resource information associated with the first user;
  generating a reward value, wherein:
    the reward value comprises a positive value, in response to determining that the first recommendation aligns with the computational resource information associated with the first user; and
    the reward value comprises a negative value, in response to determining that the first recommendation does not align with the computational resource information associated with the first user; and
  using the reward value to update the DQN algorithms;
generating a policy comprising at least the first recommendation, wherein the policy includes recommendations of hardware resources, virtual desktop resources, software resources, authentication protocols, and/or authorization levels to provision to a new user assigned to the first role; and
provisioning the new user assigned to the first role with at least the first computational resource according to the policy.

9. The method of claim 8, wherein the DQN algorithm comprises a double DQN algorithm.

10. The method of claim 8, wherein each action of the plurality of actions comprises a recommendation of at least one of hardware, software, an authorization level, and an authentication protocol.

11. The method of claim 8, wherein:
the reward value comprises a positive value; and
in response to using the reward value to update the DQN algorithm, the method further comprises:
applying the DQN algorithm to a second state of the plurality of state, to generate a second action of the plurality of actions, wherein:
the second state comprises the identification of the first role assigned to the first user and an identification of the first computational resource of the set of computational resources; and
the second action comprises a second recommendation associated with a second computational resource of the set of computational resources; and
in response to applying the DQN algorithm to the second state to generate the second action:
determining whether the second recommendation aligns with the computational resource information associated with the first user;
generating a second reward value, wherein:
the second reward value comprises a second positive value, in response to determining that the second recommendation aligns with the computational resource information associated with the first user; and
the second reward value comprises a second negative value, in response to determining that the second recommendation does not align with the computational resource information associated with the first user; and
using the second reward value to update the DQN algorithm.

12. The method of claim 11, wherein:
the first recommendation comprises a recommendation to provision the new user assigned to the first role with at least one of a laptop, a desktop computer, and a set of virtual desktop resources; and
the second recommendation comprises a recommendation to provision the new user with an operating system installed on the at least one of the laptop, the desktop computer, and the set of virtual desktop resources.

13. The method of claim 8, wherein the batch of information further comprises a set of information associated with a second user, the set of information associated with the second user comprising:
an identification of a second role within the enterprise assigned to the second user; and
second computational resource information associated with the second user, the second computational resource information comprising information associated with a set of computational resources provisioned to the second user; and
the method further comprises:
applying the DQN algorithm to a second state of the plurality of states, to generate a second action of the plurality of actions, the second state comprising an identification of the second role assigned to the second user, the second action comprising a second recommendation associated with a second computational resource of the set of computational resources; and
in response to applying the DQN algorithm to the second state to generate the second action:
determining whether the second recommendation aligns with the second computational resource information associated with the second user;
generating a second reward value, wherein:
the second reward value comprises a second positive value, in response to determining that the second recommendation aligns with the second computational resource information associated with the second user; and
the second reward value comprises a second negative value, in response to determining that the second recommendation does not align with the second computational resource information associated with the second user; and
using the second reward value to update the DQN algorithm.

14. The method of claim 13, further comprising:
receiving a second set of telemetry data from a second device associated with the second user; and
generating, based on the second set of telemetry data, the set of information associated with the second user.

15. A system comprising:
a first server configured to:
receive telemetry data from a first user device associated with a first user;
consolidate the telemetry data received from the first user device, wherein consolidating the telemetry data comprises averaging or calculating frequencies;
compress the consolidated telemetry data, wherein compressing the consolidated telemetry data comprises reducing a precision of the consolidated telemetry data;
classify the compressed and consolidated telemetry data into a set of categories, wherein the set of categories comprises a hardware/software requirements category, a software usage category, a user profile category, or an authentication/authorization protocol category;
generate a set of information associated with the first user from the classified, compressed, and consolidated telemetry data, the set of information associated with the first user comprising:
an identification of a first role of a plurality of roles within an enterprise, wherein the first user is assigned to the first role; and
computational resource information associated with the first user, the computational resource information comprising information associated with a set of computational resources provisioned to the first user and accessible to the first user through the first user device; and
transmit the set of information associated with the first user to a second server; and
the second server comprising:
a memory configured to store a deep Q reinforcement learning (DQN) algorithm configured, when executed by a hardware processor, to generate an action of a plurality of actions, based on a state of a plurality of states, wherein:
each action of the plurality of actions comprises a recommendation associated with a computational resource of a set of computational resources; and
each state of the plurality of states comprises at least an identification of a role of the plurality of roles within the enterprise; and
a hardware processor communicatively coupled to the memory, the hardware processor configured to:

receive the set of information associated with the first user from the first server;
apply the DQN algorithm to a first state of the plurality of states, to generate a first action of the plurality of actions, the first state comprising an identification of the first role assigned to the first user, the first action comprising a first recommendation associated with a first computational resource of the set of computational resources;
in response to applying the DQN algorithm to the first state to generate the first action:
  determine whether the first recommendation aligns with the computational resource information associated with the first user;
  generate a reward value, wherein:
    the reward value comprises a positive value, in response to determining that the first recommendation aligns with the computational resource information associated with the first user; and
    the reward value comprises a negative value, in response to determining that the first recommendation does not align with the computational resource information associated with the first user; and
  use the reward value to update the DQN algorithm;
generate a policy comprising at least the first recommendation, wherein the policy includes recommendations of hardware resources, virtual desktop resources, software resources, authentication protocols, and/or authorization levels to provision to a new user assigned to the first role; and
provision the new user assigned to the first role with at least the first computational resource according to the policy.

16. The system of claim 15, wherein the DQN algorithm comprises a double DQN algorithm.

17. The system of claim 15, wherein each action of the plurality of actions comprises a recommendation of at least one of hardware, software, an authorization level, and an authentication protocol.

18. The system of claim 15, wherein:
the reward value comprises a positive value; and
in response to using the reward value to update the DQN algorithm, the hardware processor is further configured to:
  apply the DQN algorithm to a second state of the plurality of state, to generate a second action of the plurality of actions, wherein:
    the second state comprises the identification of the first role assigned to the first user and an identification of the first computational resource of the set of computational resources; and
    the second action comprises a second recommendation associated with a second computational resource of the set of computational resources; and
  in response to applying the DQN algorithm to the second state to generate the second action:
    determine whether the second recommendation aligns with the computational resource information associated with the first user;
    generate a second reward value, wherein:
      the second reward value comprises a second positive value, in response to determining that the second recommendation aligns with the computational resource information associated with the first user; and
      the second reward value comprises a second negative value, in response to determining that the second recommendation does not align with the computational resource information associated with the first user; and
    use the second reward value to update the DQN algorithm.

19. The system of claim 15, wherein:
the first recommendation comprises a recommendation to provision the new user assigned to the first role with at least one of a laptop, a desktop computer, and a set of virtual desktop resources; and
the second recommendation comprises a recommendation to provision the new user with an operating system installed on the at least one of the laptop, the desktop computer, and the set of virtual desktop resources.

20. The system of claim 15, wherein:
the first server is further configured to:
  receive telemetry data from a second user device associated with a second user; and
  generate a second set of information associated with the second user from the telemetry data received from the second user device, the second set of information associated with the second user comprising:
    an identification of a second role of the plurality of roles within the enterprise, wherein the second user is assigned to the second role; and
    second computational resource information associated with the second user, the second computational resource information comprising information associated with a second set of computational resources provisioned to the second user and accessible to the second user through the second user device, wherein transmitting the set of information associated with the first user to the second server comprises transmitting a batch of information to the second server, the batch of information comprising the set of information associated with the first user and the second set of information associated with the second user;
the hardware processor is further configured to:
  receive the second set of information associated with the second user in the batch of information transmitted by the first server;
  apply the DQN algorithm to a second state of the plurality of states, to generate a second action of the plurality of actions, the second state comprising an identification of the second role assigned to the second user, the second action comprising a second recommendation associated with a second computational resource of the set of computational resources; and
  in response to applying the DQN algorithm to the second state to generate the second action:
    determine whether the second recommendation aligns with the second computational resource information associated with the second user;
    generate a second reward value, wherein:
      the second reward value comprises a second positive value, in response to determining that the second recommendation aligns with the second computational resource information associated with the second user; and
      the second reward value comprises a second negative value, in response to determining that the second recommendation does not align with the second computational resource information associated with the second user; and
use the second reward value to update the DQN algorithm.

* * * * *